United States Patent [19]

Huebscher et al.

[11] Patent Number: 5,253,842

[45] Date of Patent: Oct. 19, 1993

[54] QUICK DISCONNECT WATER VALVE ASSEMBLY

[75] Inventors: Laszlo Huebscher, New Brunswick, N.J.; Eric A. Deitrich, Woodbine, Md.

[73] Assignee: Lab Products, Inc., Maywood, N.J.

[21] Appl. No.: 922,603

[22] Filed: Jul. 30, 1992

[51] Int. Cl.⁵ ............................................. F16L 37/28
[52] U.S. Cl. ..................... 251/149.6; 251/149.1; 137/315
[58] Field of Search ................... 251/149.6, 149.1, 149; 137/315

[56] References Cited

U.S. PATENT DOCUMENTS

| | | | |
|---|---|---|---|
| 2,327,611 | 8/1943 | Scheiwer | 251/149.6 |
| 2,344,740 | 3/1944 | Shaff | 251/149.6 |
| 3,873,062 | 3/1975 | Johnson et al. | 251/149.6 |
| 4,881,569 | 11/1989 | Fournier et al. | 251/149.6 |
| 5,056,756 | 10/1991 | Norkey et al. | 251/149.6 |

*Primary Examiner*—A. Michael Chambers
*Attorney, Agent, or Firm*—Blum Kaplan

[57] ABSTRACT

A quick disconnect water valve includes a female housing for receiving a male coupling member. The female housing is formed with a channel therein providing a water pathway. An O-ring is disposed within the channel. The O-ring is disposed between a first sleeve and a second sleeve which aligns the O-ring relative to a male coupling member received by the female housing.

13 Claims, 3 Drawing Sheets

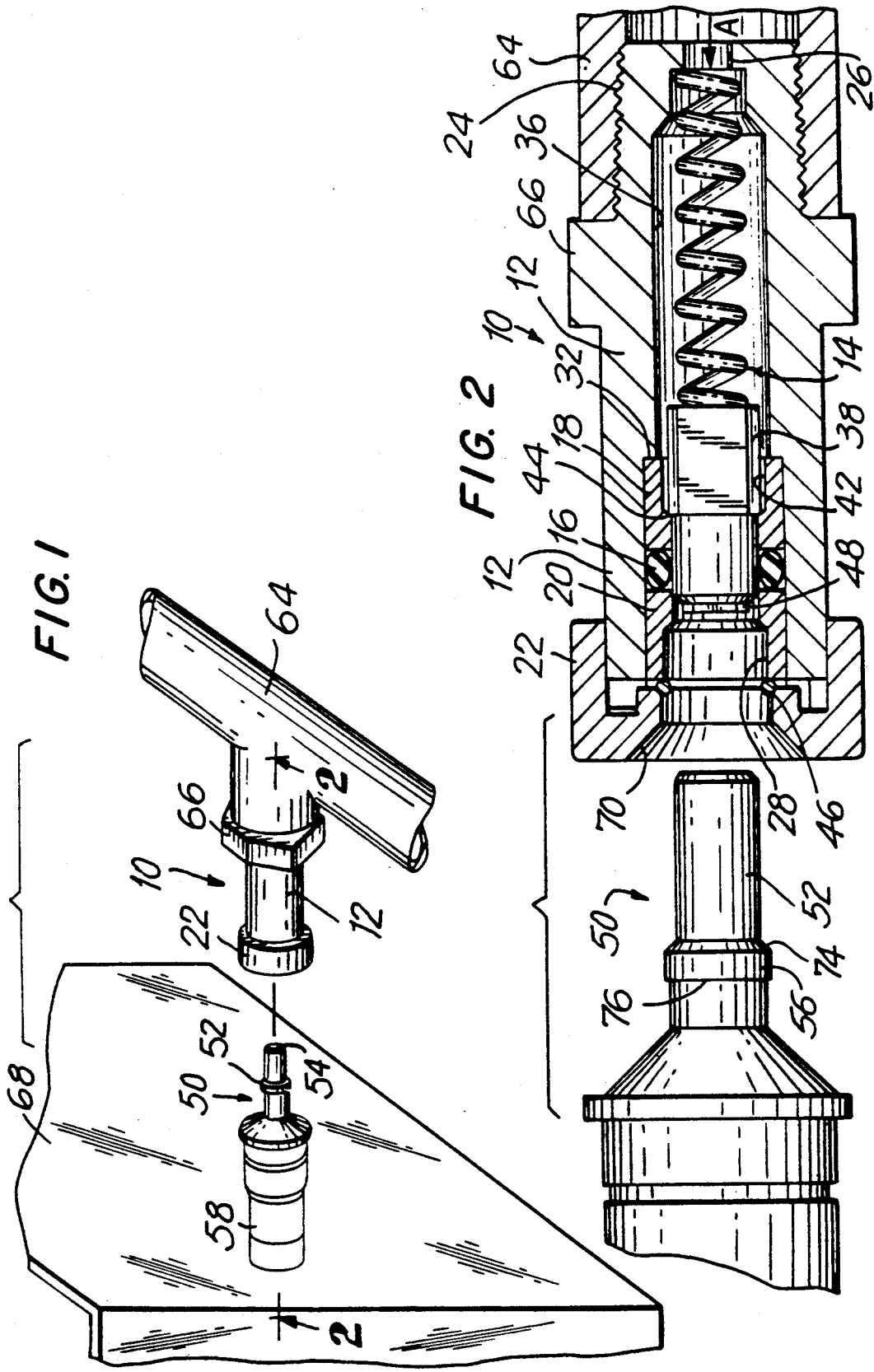

QUICK DISCONNECT WATER VALVE ASSEMBLY

BACKGROUND OF THE INVENTION

This invention is directed to a water valve assembly, and in particular, to a hands free quick disconnect water valve assembly for use in providing water from a manifold to an animal cage.

A quick disconnect water valve assembly is described in U.S. Pat. No. 4,881,569. The quick disconnect water valve assembly includes a female housing having an axial passage. A spring biased valve is located within the female axial passage and is axially movable between an open and closed position. The female member is adapted to receive a male coupling member. The male coupling member also has an axial passage so that a continuous axial passage is provided from a non-coupled end of the male member to non-coupled end of the female member to allow water flow therethrough. The male member and female member are connected to each other by a releasable connection.

The quick disconnect water valve assembly has several disadvantages. For example, as described in U.S. Pat. No. 4,881,569 because the valve assembly is manufactured within tight parameters the relative size, dimensions and positioning of each member is essential to effect alignment of the male member to the female member. Also, such valve assemblies require high precision sonic welding of the male member and female member which is not easily repeatable resulting in a number of alignment defects when coupling the male and female members together. Also, when the welding tolerances are not obtained, the O-ring will not properly seal and cause water leakage. Additionally, because the O-ring never completely seals about the male member due to an imprecise mounting of the O-ring, the O-ring never engages the back wall of the O-ring seat causing further misalignment and further leakage. Accordingly, a water valve which utilizes the configuration of the female member to effect alignment rather than attempting to align the construction of the female portion to the male portion is desired.

SUMMARY OF THE INVENTION

Generally speaking, in accordance with the instant invention, a quick disconnect water valve assembly is provided for coupling a water source to a water using device. A housing includes a first open end and a second open end. An axial channel couples the first open end to the second open end. A first sleeve is disposed within the channel co-axially therewith and is separated from the first sleeve by a gap. An O-ring is disposed within the gap and maintained in proper position and orientation by the sleeves. The housing, sleeves and O-ring are adapted to receive a male member affixed to the water using device and to guide the male member to the O-ring.

In an exemplary embodiment a spring loaded plunger is provided within the axial channel and is displaceable between a first position and a second position. The plunger forms a water tight seal in the first position and allows water to pass through the channel in the second position.

Accordingly, it is an object of the instant invention to provide an improved quick disconnect water valve assembly.

A further object of the instant invention is to provide a quick disconnect water valve assembly which controls alignment solely based upon the configuration of one body part rather than two body parts.

Yet another object of the instant invention is to provide a quick disconnect valve which provides a positioning structure for the O-ring so that the O-ring is always sealed against the inner surface of the main body to assure an accurate seal.

Still a further object of the invention is to provide a quick disconnect valve which does not require precise sonic welding of both the female member and male member to ensure proper alignment.

Yet another object of the invention is to provide a single construction which is capable of aligning a received male member even if the internal construction of the female member is not perfectly aligned.

Still other objects and advantages of the invention will in part be obvious and will be apparent from the specification.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a better understanding of the invention, reference is had to the following description taken in connection with the accompanying drawings in which:

FIG. 1 is an exploded perspective view of a quick disconnect valve constructed in accordance with the invention in use;

FIG. 2 is a sectional view of the quick disconnect valve along line 2—2 of FIG. 1;

DETAILED DESCRIPTION OF THE PREFERRED EMBODIMENT

Figure 3:
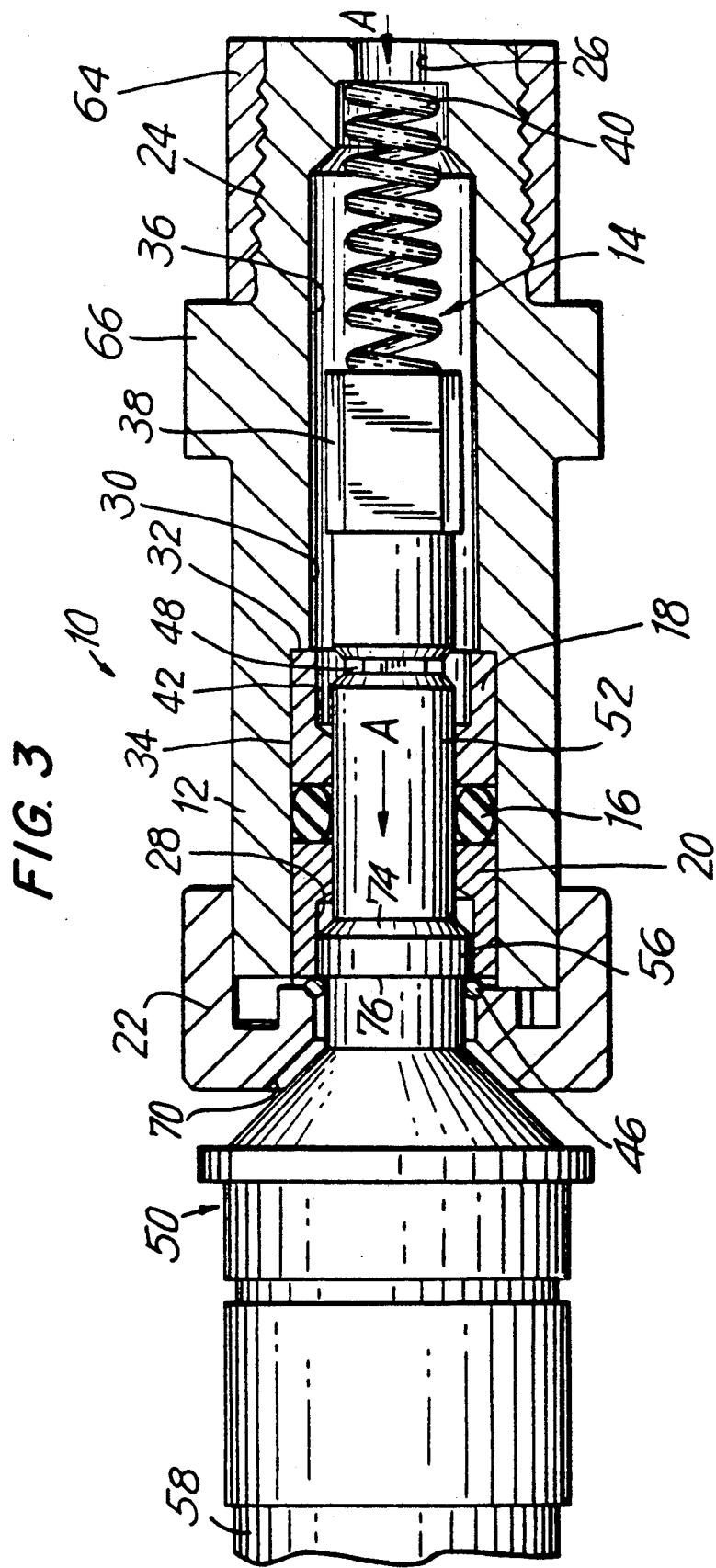
FIG. 3 is a sectional view of the quick disconnect valve of FIG. 2 after insertion of a male member.
Figure 4:
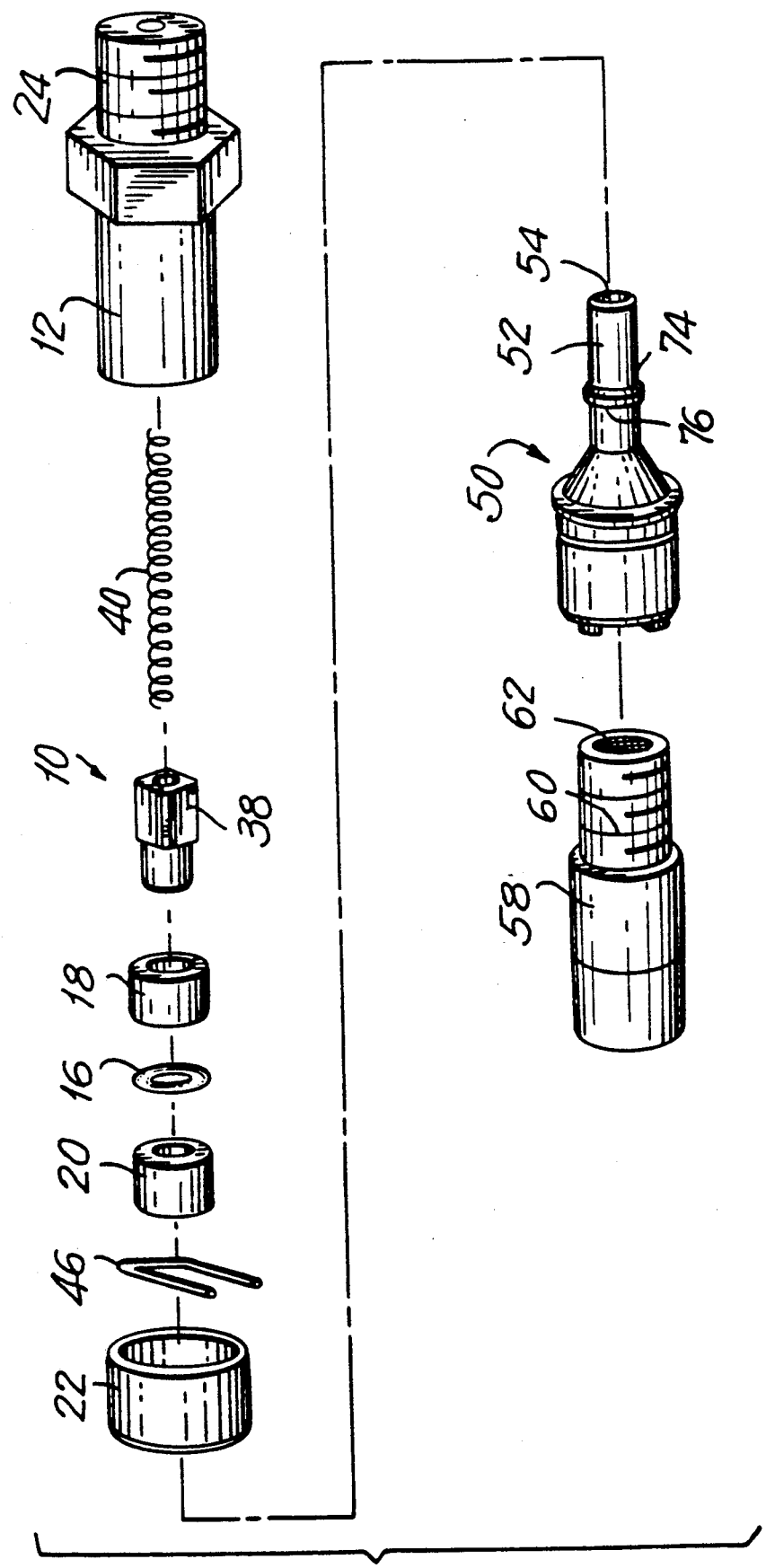
FIG. 4 is an exploded view of the quick disconnect and male member constructed in accordance with the invention.

Reference is made to FIGS. 2–4 in which a quick disconnect water valve assembly, generally indicated as 10, is provided. Quick disconnect valve 10 includes a female housing 12. A plunger assembly, generally indicated as 14 is disposed within housing 12. An O-ring gasket 16 disposed between a first sleeve 18 and a second sleeve 20 is seated within female housing 12. A cap 22 is affixed to female housing 12 at one end. The other end of female housing 12 is formed with threads 24.

Female housing 12 is formed with a first opening 26 at one end, a second opening 28 at the opposed end formed co-axially with opening 26 and a channel 30 having stepped widths coupling opening 26 to opening 28 providing a fluid passageway therebetween. A shoulder 32 is formed within channel 30 separating a first portion 34 of channel 30 having a first channel diameter from a second channel portion 36 having a smaller channel diameter. First sleeve 18 is disposed within the first channel portion 34. The outer diameter of sleeve 18 is substantially equal to the diameter of first channel portion 34 so that first sleeve 18 abuts against shoulder 32. Second sleeve 20 also has an outer diameter substantially equal to the diameter of first channel portion 34 and is disposed in first channel portion 34 separated from first sleeve 18 by O-ring 16. O-ring 16 is formed of flexible material which may exhibit compression, deformation and expansion. O-ring 16 has a diameter slightly greater than the inner diameter of first channel portion 34 so that the outer diameter of O-ring 16 expands against the inner diameter of first channel portion 34 to form a seal. The open centers of sleeve 18, sleeve 20 and O-ring 16 are substantially coaxial with channel 30.

Plunger assembly 14 is disposed within second channel portion 36 of channel 30 and includes a plunger 38 and a spring 40. Spring 40 biases plunger 38 towards first sleeve 18. First sleeve 18 is formed with a groove 42 therein adapted to receive plunger 38. Spring 40 biases plunger 38 into first sleeve 18 and through O-ring 16. Plunger 18 comes in contact with a shoulder 44 formed within sleeve 18 preventing further movement of plunger 38. Plunger 38 has outer diameters slightly greater than the inner diameter of O-ring 16 compressing O-ring 16 as it passes therethrough causing O-ring 16 to become shorter and wider forming a water tight seal between O-ring 16, sleeves 18, 20 and plunger 38. Plunger 38 is formed with a spacer 48 at the end thereof. Spacer 48 is substantially rectangular in shape having a width substantially less than the body of plunger 38.

A U-clip 46 is mounted within cap 22. Cap 22 is mounted about female housing 12 and abuts against second sleeve 20. Sleeve 18, O-ring 16 and second sleeve 20 are maintained in position by shoulder 32 at one end and cap 22 at the other preventing sliding along channel 30. As a result of such construction, sleeves 18, 20 maintain O-ring 16 properly positioned and oriented to receive a male coupling member. Additionally, spring 40 is unable to bias plunger 38 with enough force to move the entire O-ring sleeve assembly out of channel 30.

Female housing 12 is adapted to receive a male coupling member 50. Male coupling member 50 includes a narrow nose 52 dimensioned to be received within sleeves 18, 20 (FIG. 3). Male coupling member 50 is formed with a channel therein extending from an opening 54 (FIG. 4) within nose 52. When male coupling 50 is inserted within female housing 12 a water passageway is provided from opening 26 through opening 54 to the rear of male coupling member 50. Male coupling member 50 is formed with a neck collar 56. Male coupling member 50 is adapted to couple with a drinking valve 58. Drinking valve 58 is provided with threads 60 to mount on male coupling member 50 and is provided with a screen 62 therein to filter debris from water passing through male coupling member 50.

Reference is now also made to FIG. 1 to describe operation of the quick disconnect vale 10. Housing 12 is screwed onto a water supply manifold 64. In an exemplary embodiment housing 12 has a nut 66 adjacent to threads 24 to facilitate screwing of female housing 12 onto water manifold 64. Water from water manifold 64 enters channel 30 in a direction of arrow A. Because plunger 38 is biased by spring 40 through O-ring 16 pressing O-ring 16 to form a watertight seal, second channel portion 36 fills with water and no water passes to first channel portion 34.

Male coupling member 50 is mounted, by way of example, in the sidewall 68 of an animal cage. Drinking valve 58 is mounted to male coupling member 50 within the cage to allow access to drinking water to the animals within the cage. Male coupling member 50 is mounted utilizing either a single grommet or double grommet mounting system as known in the art. To provide water to drinking valve 58, male coupling member 50 is inserted through cap 22 into female housing 10. Cap 22 is formed with a conical opening 70 therein so that the sloped sides of opening 70 guide nose 52 into channel 30. The inner diameter of sleeve 20 is also conically shaped further guiding nose 52 towards the inner diameter of O-ring 16. As nose 52 progresses through channel 30 nose 52 contacts spacer 48 pushing plunger 38 into second channel portion 36. (FIG. 3)

The outer diameter of nose 52 is also larger than the inner diameter of O-ring 16 pressing O-ring 16 against the inner wall of first chamber portion 34 squeezing O-ring 16 between nose 52, female housing 10 and first and second sleeves 18, 20 forming a water tight seal. The diameter of spacer 48 is less than the diameter of plunger 38 so that water flows around plunger 48 into opening 54 causing water to travel through male coupling member 50 to drinking valve 58 in the direction of arrows A.

A collar 56 is formed with a slanted front surface 74 and a straight rear surface 76. As nose 52 passes through cap 22 front surface 74 causes U-clip 46 to pass over collar 56 and rest behind straight rear surface 76 so that clip 46 locks nose 52 in place. Clip 46 maintains male coupling member 50 within female housing 10 until a sufficient force is applied in the direction of arrow A to release collar 56 from clip 46. As male coupling member 50 is withdrawn from female housing 12, spring 40 biases plunger 38 in the direction of male coupling member 50 forming a watertight seal upon withdrawal of male coupling member 50 preventing water leakage.

In an exemplary embodiment, female housing 12, cap 22, plunger 38 and sleeves 18, 20 are formed from molded plastic. Accordingly, female housing 12 is formed of a single uniform body of simple design to provide a best fit while utilizing the internal structures of cap 22 and sleeves 18, 20 to guide male coupling member 50. Opening 70 and the inner diameter of second sleeve 20 are formed in a shape which substantially parallels the shape of male coupling 50. Accordingly, by providing a quick disconnect valve which utilizes only the structures within the female housing to align the O-ring, female housing and male coupling member, a quick disconnect coupling device having an O-ring which is always sealed within the inner circumference of the main body is provided resulting in an accurate seal. Because a sub-assembly of sleeves are used as the guiding structure, the guiding structure may be molded rather than sonic welded providing improved alignment for guiding the plunger as well as the male coupling. The plunger and male coupling are guided in an aligned manner even if the sleeves are not perfectly aligned.

The quick disconnect valve in the above embodiment is illustrated as being mounted to the water manifold by way of example only. The female housing may also be mounted to the drinking valve and the male coupling member may be coupled to the manifold without changing the operation or benefits of the invention.

It will thus be seen that the object set forth above, among those made apparent from the preceding description are efficiently obtained and, some certain changes may be made in the construction set forth without departing from the spirit and scope of the invention, it is intended that all matter contained in the above description and shown in the accompanying drawings shall be interpreted as illustrative and not in the limiting sense.

It is also to be understood that the following claims are intended to cover all the generic and specific features of the invention herein described and all statements of the scope of the invention which as a matter of language might be said to fall therebetween.

What is claimed is:

1. A quick disconnect water valve comprising female housing means for receiving a male coupling member, said female housing means having a channel formed therein, an O-ring disposed within said channel, alignment means disposed within said channel for aligning said O-ring relative to said male coupling member and said female housing means, said alignment means including a first sleeve slideably disposed within said channel, a second sleeve slideably disposed within said channel, said O-ring being disposed between said first sleeve and second sleeve, wherein said channel permits the flow of a liquid through said female housing means.

2. The quick disconnect water valve of claim 1, further comprising plunger means disposed within said channel, said plunger means being disposable between a first position for preventing water from flowing through said channel to a second position for permitting the flow of a liquid through said channel.

3. The quick disconnect water valve of claim 2, wherein said plunger means includes a plunger and a spring, said spring biasing said plunger towards said O-ring in said first position.

4. The quick disconnect water valve of claim 4, wherein said plunger has a distal end and a spacer formed on said distal end.

5. The quick disconnect water valve of claim 4, further comprising a U-shaped clip mounted in said cap.

6. The quick disconnect water valve of claim 3, wherein said plunger has a distal end and a spacer formed on said distal end.

7. The quick disconnect water valve of claim 1, wherein said channel includes a first channel portion and a second channel portion, said first channel portion having a different diameter than the diameter of the second channel portion forming a shoulder where the first channel portion meets the second channel portion and further comprising a cap, said alignment means contacting said cap and said shoulder preventing movement of said alignment means along said channel.

8. The quick disconnect water valve of claim 1, wherein said female housing means is formed as a unitary member.

9. The quick disconnect water valve of claim 1, wherein said first sleeve is formed with a guide surface therein for guiding said male coupling member to said O-ring.

10. The quick disconnect water valve of claim 1, wherein said housing means has an outer surface, and further comprising anchoring means mounted on said outer surface of said housing means for selectively maintaining said first sleeve, O-ring and second sleeve within said channel.

11. The quick disconnect water valve of claim 1, wherein said anchoring means includes a cap.

12. A quick disconnect water valve comprising female housing means for receiving a male coupling member, said female housing means having a channel formed therein providing a water pathway through said female housing means, an O-ring disposed within said channel, alignment means disposed within said channel for aligning said O-ring relative to said male coupling member, said alignment means including a first sleeve slideably disposed within said channel and a second sleeve slideably disposed within said channel, said O-ring being disposed between said first sleeve and said second sleeve and plunger means disposed within said channel, said plunger means being disposable between a first position for preventing water from flowing through said channel to a second position for permitting water to flow through said channel, said plunger means including a plunger and a spring, said spring biasing said plunger towards said O-ring in said first position.

13. The quick disconnect water valve of claim 12, wherein said first sleeve is formed with a guide surface therein for guiding said male coupling member to said O-ring.

* * * * *